(12) United States Patent
Banthia

(10) Patent No.: US 9,400,888 B1
(45) Date of Patent: Jul. 26, 2016

(54) SYSTEMS AND METHODS FOR MITIGATING EFFECTS OF AN UNRESPONSIVE SECURE ELEMENT DURING LINK ESTABLISHMENT

(71) Applicant: QUALCOMM Incorporated, San Diego, CA (US)

(72) Inventor: Ashish Banthia, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/836,611

(22) Filed: Aug. 26, 2015

Related U.S. Application Data

(60) Provisional application No. 62/126,364, filed on Feb. 27, 2015.

(51) Int. Cl.
*H04B 5/00* (2006.01)
*G06F 21/57* (2013.01)
*H04W 76/02* (2009.01)

(52) U.S. Cl.
CPC ............ *G06F 21/572* (2013.01); *H04B 5/0031* (2013.01); *H04W 76/02* (2013.01)

(58) Field of Classification Search
CPC .............. G06F 11/076; G06F 11/0793; G06K 7/10237; G06Q 20/3278; H04L 1/08; H04L 1/1887; H04N 19/61
USPC ............ 455/41.1, 41.2, 418, 426.1, 410, 411, 455/550.1, 557; 340/10.1, 10.51; 235/380, 235/492, 439, 487; 714/55; 370/254, 464, 370/401, 445, 338; 705/44; 726/4, 5; 713/190, 186, 182
See application file for complete search history.

(56) References Cited

U.S. PATENT DOCUMENTS 8,504,097 B1 * 8/2013 Cope .................... H04M 1/7253
455/41.1
8,712,407 B1 * 4/2014 Cope ....................... H04W 4/00
455/41.1

(Continued)

FOREIGN PATENT DOCUMENTS

| EP | 2365676 A1 | 9/2011 |
|---|---|---|
| WO | 0108439 A1 | 2/2001 |
| WO | 0244921 A1 | 6/2002 |

OTHER PUBLICATIONS

FAQ, "Adafruit PN532 RFID/NFC Breakout and Shield," Adafruit Learning System, Retrieved date on Apr. 21, 2015, Retrieved from the Internet < URL: https://learn.adafruit.com/adafruitpn532rfidnfc/faq >, pp. 5-7.

(Continued)

*Primary Examiner* — Tan H Trinh
(74) *Attorney, Agent, or Firm* — Austin Rapp & Hardman

(57) ABSTRACT

A method of communicating with a secure element (SE) is described. The method includes transmitting successive RSET frames from a single wire protocol (SWP) interface to an SE, the successive RSET frames including RSET frame retransmissions. The method also includes counting a number of successive RSET frame retransmissions due to a timer expiring. The method further includes generating a firmware interrupt in response to determining that the count has reached a threshold. The method additionally includes deactivating the SWP interface based on the firmware interrupt.

30 Claims, 8 Drawing Sheets

(56) References Cited

U.S. PATENT DOCUMENTS

| | | | |
|---|---|---|---|
| 8,929,812 B2 | 1/2015 | Gree | |
| 9,183,491 B2* | 11/2015 | Moreton | G06Q 20/3226 |
| 9,325,383 B2* | 4/2016 | Ballesteros | H04B 5/02 |
| 2003/0119516 A1 | 6/2003 | Tomishima et al. | |
| 2007/0110091 A1* | 5/2007 | Kwon | H04B 7/0613 |
| | | | 370/445 |
| 2007/0116022 A1* | 5/2007 | Kwon | H04L 12/2602 |
| | | | 370/401 |
| 2008/0010562 A1* | 1/2008 | Kim | G06F 13/4291 |
| | | | 714/55 |
| 2008/0144650 A1* | 6/2008 | Boch | G06K 7/0008 |
| | | | 370/464 |
| 2008/0253387 A1 | 10/2008 | Liang et al. | |
| 2008/0313487 A1* | 12/2008 | Mochizuki | G06F 1/04 |
| | | | 713/601 |
| 2009/0103732 A1* | 4/2009 | Benteo | G06Q 20/32 |
| | | | 380/270 |
| 2010/0019033 A1* | 1/2010 | Jolivet | G06K 7/0008 |
| | | | 235/380 |
| 2010/0108772 A1* | 5/2010 | Hartel | G06K 19/07 |
| | | | 235/492 |
| 2010/0330904 A1* | 12/2010 | Stougaard | H04L 67/12 |
| | | | 455/41.1 |
| 2012/0011572 A1* | 1/2012 | Chew | H04L 63/0853 |
| | | | 726/4 |
| 2012/0087355 A1* | 4/2012 | Wentink | H04W 74/006 |
| | | | 370/338 |
| 2012/0108169 A1* | 5/2012 | Degauque | G06K 7/10247 |
| | | | 455/41.1 |
| 2012/0178365 A1* | 7/2012 | Katz | G06K 7/10237 |
| | | | 455/41.1 |
| 2012/0178366 A1* | 7/2012 | Levy | G06K 7/10237 |
| | | | 455/41.1 |
| 2012/0309302 A1* | 12/2012 | Buhot | H04B 5/00 |
| | | | 455/41.1 |
| 2013/0115935 A1* | 5/2013 | Boehler | G06K 7/10237 |
| | | | 455/418 |
| 2013/0212407 A1* | 8/2013 | Walton | G06F 21/72 |
| | | | 713/190 |
| 2014/0022060 A1* | 1/2014 | Boehler | H04L 63/0492 |
| | | | 340/10.51 |
| 2014/0036723 A1* | 2/2014 | Rizzo | G06K 7/0008 |
| | | | 370/254 |
| 2014/0136350 A1* | 5/2014 | Savolainen | G06Q 20/3229 |
| | | | 705/17 |
| 2014/0154979 A1* | 6/2014 | Tomas | G06F 9/4403 |
| | | | 455/41.1 |
| 2014/0304094 A1 | 10/2014 | Reddy et al. | |
| 2014/0364058 A1* | 12/2014 | Chew | G06F 21/34 |
| | | | 455/41.1 |
| 2014/0369170 A1 | 12/2014 | Inha et al. | |
| 2014/0379575 A1* | 12/2014 | Rogan | G06Q 20/3278 |
| | | | 705/44 |
| 2015/0137943 A1* | 5/2015 | Nagel | G07C 9/00309 |
| | | | 340/5.72 |
| 2015/0236756 A1* | 8/2015 | Ballesteros | H04B 5/0031 |
| | | | 455/41.1 |
| 2015/0256537 A1* | 9/2015 | Chew | G06F 21/30 |
| | | | 726/7 |
| 2015/0271677 A1* | 9/2015 | Van Nieuwenhuyze | H04W 4/008 |
| | | | 455/41.1 |
| 2015/0278798 A1* | 10/2015 | Lerch | G06Q 20/3278 |
| | | | 705/39 |
| 2015/0339659 A1* | 11/2015 | Ballesteros | G06Q 20/3229 |
| | | | 705/76 |
| 2016/0020801 A1* | 1/2016 | Dos Santos | H04B 1/3816 |
| | | | 455/558 |
| 2016/0088560 A1* | 3/2016 | Banthia | H04W 52/0229 |
| | | | 370/311 |
| 2016/0112159 A1* | 4/2016 | Banthia | G06F 11/076 |
| | | | 714/748 |
| 2016/0119031 A1* | 4/2016 | Sabetti | H04B 5/0031 |
| | | | 455/41.1 |
| 2016/0127857 A1* | 5/2016 | O'Donoghue | G06K 19/0723 |
| | | | 455/41.1 |

OTHER PUBLICATIONS

"Smart Cards: UICC—Contactless Front-end (CLF) Interface; Part 1: Physical and data link layer characteristics (Release 11)," ETSI TS 102 613, V11.0.0, Sep. 2012, pp. 1-57.

International Search Report and Written Opinion—PCT/US2016/015598—ISA/EPO—Apr. 7, 2016.

* cited by examiner

SYSTEMS AND METHODS FOR MITIGATING EFFECTS OF AN UNRESPONSIVE SECURE ELEMENT DURING LINK ESTABLISHMENT

RELATED APPLICATIONS

This application is related to and claims priority from U.S. Provisional Patent Application Ser. No. 62/126,364, filed Feb. 27, 2015, for "SYSTEMS AND METHODS FOR MITIGATING EFFECTS OF AN UNRESPONSIVE SECURE ELEMENT DURING LINK ESTABLISHMENT."

TECHNICAL FIELD

The present disclosure relates generally to electronic devices. More specifically, the present disclosure relates to systems and methods for mitigating effects of an unresponsive secure element (SE) during link establishment.

BACKGROUND

The use of electronic devices has become common. In particular, advances in electronic technology have reduced the cost of increasingly complex and useful electronic devices. Cost reduction and consumer demand have proliferated the use of electronic devices such that they are practically ubiquitous. And, as the use of electronic devices has expanded, so has the demand for new and improved features for them. More specifically, electronic devices that perform new functions and/or perform faster, more efficiently, or with higher quality are often in high demand.

Some electronic devices (e.g., smartphones) transmit wireless signals. For example, wireless signals may be utilized to communicate with other electronic devices.

In some cases, electronic devices and/or one or more elements of electronic devices may become unresponsive. For example, unforeseen uses and/or errors in operation may cause the electronic device and/or one or more elements of the electronic device to enter an unresponsive state (e.g., infinite loop). This may result in a poor user experience and/or operation issues. As can be observed from this discussion, improving system responsiveness may be beneficial.

SUMMARY

A method of communicating with a secure element (SE) is described. The method includes transmitting successive RSET frames from a single wire protocol (SWP) interface to an SE, the successive RSET frames including RSET frame retransmissions. The method also includes counting a number of successive RSET frame retransmissions due to a timer expiring. The method further includes generating a firmware interrupt in response to determining that the count has reached a threshold. The method additionally includes deactivating the SWP interface based on the firmware interrupt.

The RSET frame retransmissions may occur during a simplified high level data link control (SHDLC) link establishment procedure. The RSET frame retransmissions may occur before any payload data is sent or received.

The SWP interface may be established by a contactless front-end (CLF) communicatively coupled to the SE. The CLF may include a near-field communication (NFC) controller, and the SE may include at least one of a universal integrated circuit card (UICC) or an embedded SE.

The method may also include resetting the count in response to detecting activity from the SE. The method may also include resetting the count in response to reactivating the SWP interface. The method may also include resetting the count in response to a second timer expiration.

An electronic device configured to communicate with an SE is also described. The electronic device includes a processor, a memory in communication with the processor, and instructions stored in the memory. The instructions are executable by the processor to transmit successive RSET frames from an SWP interface to an SE, the successive RSET frames including RSET frame retransmissions. The instructions are also executable by the processor to count a number of successive RSET frame retransmissions due to a timer expiring. The instructions are further executable by the processor to generate a firmware interrupt in response to determining that the count has reached a threshold. The instructions are additionally executable by the processor to deactivate the SWP interface based on the firmware interrupt.

An apparatus configured to communicate with an SE is also described. The apparatus includes means for transmitting successive RSET frames from an SWP interface to an SE, the successive RSET frames including RSET frame retransmissions. The apparatus also includes means for counting a number of successive RSET frame retransmissions due to a timer expiring. The apparatus further includes means for generating a firmware interrupt in response to determining that the count has reached a threshold. The apparatus additionally includes means for deactivating the SWP interface based on the firmware interrupt.

A computer-program product for communicating with an SE is also described. The computer-program product includes a non-transitory computer-readable medium having instructions thereon. The instructions include code for causing an electronic device to transmit successive RSET frames from an SWP interface to an SE, the successive RSET frames including RSET frame retransmissions. The instructions also include code for causing the electronic device to count a number of successive RSET frame retransmissions due to a timer expiring. The instructions further include code for causing the electronic device to generate a firmware interrupt in response to determining that the count has reached a threshold. The instructions additionally include code for causing the electronic device to deactivate the SWP interface based on the firmware interrupt.

DETAILED DESCRIPTION

Figure 1:
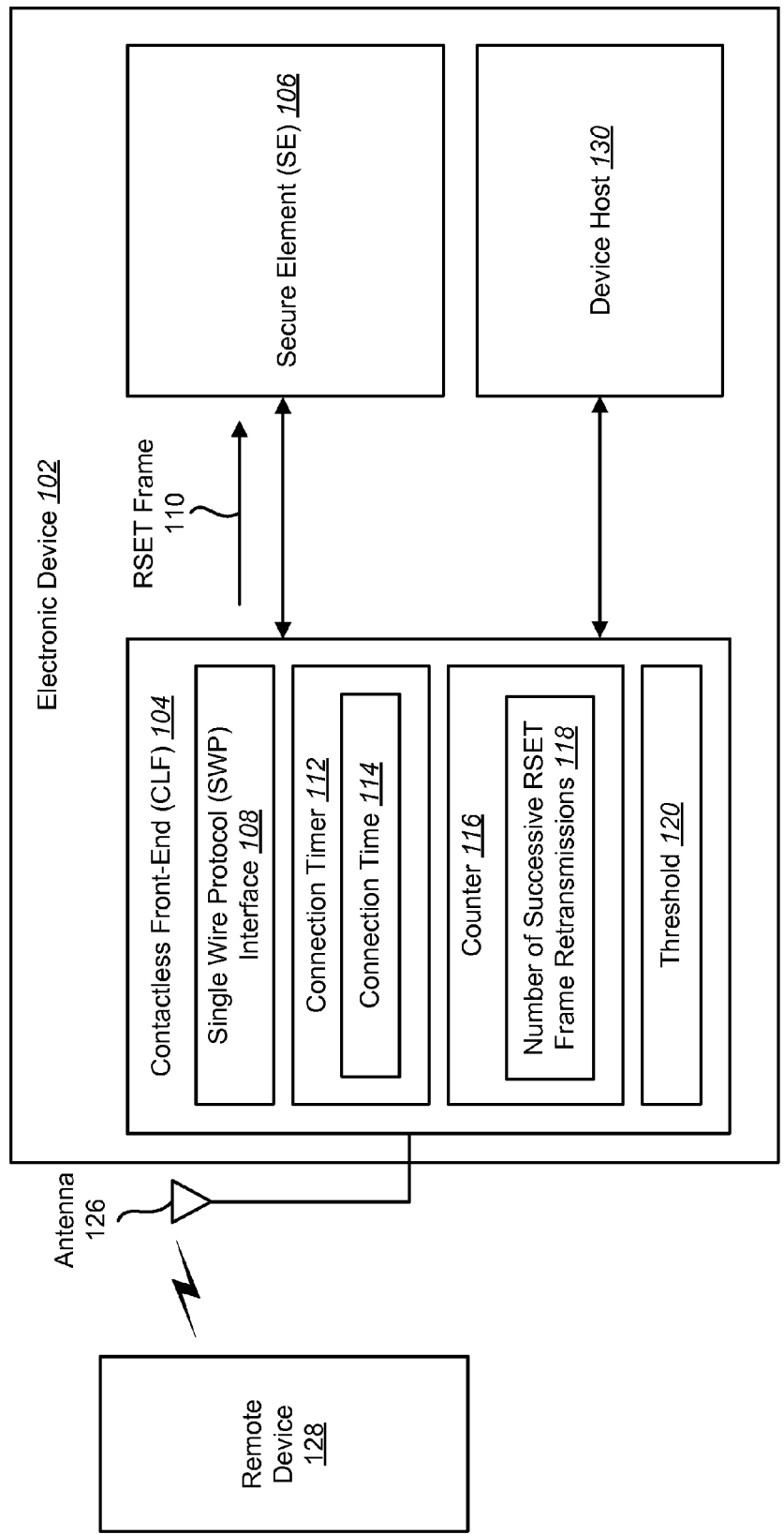
FIG. 1 is a block diagram illustrating one configuration of an electronic device in which systems and methods for mitigating effects of an unresponsive secure element (SE) during link establishment may be implemented.

The systems and methods disclosed herein may be applied to communication devices that communicate wirelessly and/or that communicate using a wired connection or link. For example, some communication devices may communicate with other devices using an Ethernet protocol. In another example, some communication devices may communicate with other devices using wireless communication. In one configuration, the systems and methods disclosed herein may be applied to a communication device that communicates with another device using an induction-based communication technology. One implementation of inductively coupled communication technology is near-field communication (NFC).

An electronic device may include a contactless front-end (CLF). In some configurations, the CLF may be a near-field communication (NFC) chip (also referred to as an NFC card, NFC controller chip, NFC controller, etc.). The direction for the data flow in the NFC communication standards is characterized by having a first device (also referred to as a poller, polling device, proximity coupling device (PCD) or initiator) provide an electromagnetic field (also referred to as an RF-field). A second device (also referred to as a listener, listening device, proximity integrated circuit card (PICC) or target) may be inductively coupled to the magnetic field and may exchange data via the magnetic field.

In one implementation of NFC, an electronic device may perform contactless payment services. In this implementation, the electronic device may act as a credit card. This RF-based contactless payment approach may be appealing to users because of its ease of use. For example, users may benefit from increased speed, control of transactions and using the electronic device instead of cash. Multiple NFC applications may be supported by an electronic device. These NFC applications may include credit/debit payment, public transport ticketing, and loyalty and service initiation.

Security is an important consideration with contactless payment services. Retail and transit payments with an electronic device (e.g., a mobile phone) may involve wireless carriers, retailers, transport providers and/or banks all working together. All of the transaction and payment card accounts information may be kept secure and apart. For this reason, contactless payment services may use a secure element (SE) to store sensitive information such as credit card account numbers, transit accounts, and mobile phone details.

The CLF may establish a communication interface with the SE to pass information from the SE to a remote device via the CLF or to be used within the electronic device itself. In one configuration, this interface may be a single wire protocol (SWP) interface. However, the SE may become unresponsive in some cases. For example, the SE may become unresponsive during link establishment. Therefore, systems and methods for mitigating effects of an unresponsive secure element (SE) during link establishment may be beneficial.

Some configurations of the systems and methods disclosed herein may relate to a mechanism to detect and mitigate effects of an unresponsive SE during simplified high level data link control (SHDLC) link establishment. After the SWP interface is activated, a CLF (e.g., NFC Controller (NFCC)) may perform SHDLC link establishment with the endpoint (e.g., secure element (SE)). The CLF may send a first reset (RSET) frame and may start a connection timer (e.g., T3 timer) at the end of the transmission. The connection time (T3) may be calculated from the last bit of the end of frame (EOF) of the RSET frame to the first bit of the start of frame (SOF) of the response frame.

The CLF expects the SE to respond with a response frame before the connection timer expires. For example, the CLF may expect to receive an unnumbered acknowledgment (UA) frame or another RSET frame to negotiate the SHDLC link parameters like window size and support for selective reject (SREJ) before the connection timer expires.

Cases have been observed where the SE may get hung up and not respond at all. If this were to happen, the connection timer will expire and the CLF will retransmit the RSET frame and re-start the connection timer again. This would continue endlessly since CLF specifications (e.g., the European Telecommunications Standards Institute (ETSI) specifications) do not cover this scenario. This will most likely cause a dead lock situation where the CLF keeps retransmitting the RSET frame (every time the connection timer expires) because the CLF has no way of detecting this condition where the SE is unresponsive. The SE may be unresponsive because it has been removed or it has ended up in a bad state.

Some configurations of the systems and methods disclosed herein may include a mechanism to keep track of how many times the RSET frame has been retransmitted to the SE without any activity whatsoever from the SE. A counter can be deployed that gets reset back to zero when there is detected activity from the SE during SHDLC link establishment. If there is no detected activity, then the counter may increment every time a connection timer expires and the RSET frame is retransmitted.

If the counter reaches a certain "quit" threshold, which can be programmable, then the CLF hardware (HW) may interrupt the CLF firmware (FW) about a possibly unresponsive SE. The CLF FW may disable the SWP block, which in turn may deactivate the SWP interface.

The CLF may try to activate the SWP interface again after waiting for a deactivation time (P4). In an implementation, a single wire protocol input/output (SWIO) line may be held low for at least the deactivation time before the SWP interface can be activated again. In many cases, deactivating the interface and re-activating the interface after the deactivation time will resolve the problem and help the SE resume its normal behavior.

Various configurations are now described with reference to the Figures. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of an electronic device 102 in which systems and methods for mitigating effects of an unresponsive secure element (SE) 106 during link establishment may be implemented. Examples of electronic devices 102 include wireless communication devices, cellular phones, smartphones, tablet devices, voice recorders, digital cameras, still cameras, camcorders, gaming systems, laptop computers, etc. Each component of the electronic device 102 described herein may be implemented in hardware (e.g., circuitry) or a combination of hardware and software (e.g., a processor with executable instructions stored in memory).

In some scenarios, electronic device 102 may perform contactless payment services. Multiple applications may be supported by the electronic device 102. For example, these applications may include credit/debit payment, public transport ticketing, and loyalty and service initiation.

The electronic device 102 may include a contactless front-end (CLF) 104. In some configurations, the CLF 104 may be a near-field communication (NFC) chip (also referred to as an NFC card, NFC controller chip, NFC controller (NFCC), etc.).

The CLF 104 may communicate with a remote device 128 via an antenna 126. For example, the CLF 104 may perform inductively coupled communication with the remote device 128.

The CLF 104 may establish an interface between a device host 130 (also referred to as an application processor). In the case of NFC, the interface between the device host 130 and the CLF 104 may be an NFC controller interface (NCI).

The electronic device 102 may include at least one secure element (SE) 106. The SE 106 may be removable or embedded. Examples of a removable SE 106 include a subscriber identity module (SIM) card or a universal integrated circuit card (UICC). An embedded SE 106 may be integrated into the electronic device 102. The SE 106 may store sensitive information. For example, the SE 106 may store credit card account numbers, transit accounts and/or mobile phone details. To enable proximity payments, the SE 106 may authenticate itself to a bank, and may be resistant to physical or logical attack.

To enable communication with the SE 106, the CLF 104 may activate a single wire protocol (SWP) interface 108. In a configuration, the SWP interface 108 is a serial interface that can support full duplex transmission between the CLF 104 and the SE 106. The SWP interface 108 is described in more detail in connection with FIG. 3.

Upon activating the SWP interface 108, the CLF 104 may attempt to establish a simplified high level data link control (SHDLC) link with the SE 106. As described above, the CLF 104 may send an initial RSET frame 110 as part of the SHDLC link establishment procedure. The CLF 104 may start a connection timer 112 at the end of the RSET frame 110 transmission. The connection timer 112 may also be referred to as a T3 timer. In an implementation, the connection time 114 (e.g., T3) may be calculated from the last bit of the end of frame (EOF) of the RSET frame 110 to the first bit of the start of frame (SOF) of the response frame.

As part of the SHDLC link establishment procedure, the CLF 104 expects the SE 106 to respond to the RSET frame 110 with a response frame before the connection timer 112 (e.g., T3 timer) expires. The response frame may be a UA frame or another RSET frame used to negotiate the SHDLC link parameters like window size and support for selective reject (SREJ).

As described above, cases have been observed where an SE 106 may get hung up and not respond at all. In one example, an SE 106 may become unresponsive if the SE 106 is removed (e.g., the SIM card is removed) during link establishment. In another example, the SE 106 may become unsynchronized (e.g., does not respond in an expected time window and/or responds in an unexpected time window). In yet another example, the SE 106 may have an operation error and/or may enter a bad state.

Some configurations of the systems and methods disclosed herein may keep track of how many times the RSET frame 110 has been retransmitted to the SE 106 without any activity (e.g., response frame) from the SE 106. The CLF 104 may include a counter 116. The counter 116 may record the number of successive RSET frame retransmission(s) 118.

The counter 116 may be reset (back to zero, for example) in response to detecting activity from the SE 106. For instance, the counter 116 may be reset when there is any signaling from the SE 106 (e.g., any S2 signal activity from the SE 106) during SHDLC link establishment. If there is no signaling from the SE 106 (e.g., no S2 signal activity), then the counter 116 may increment every time the connection timer 112 (e.g., T3 timer) expires and the RSET frame 110 is retransmitted.

If the counter 116 reaches a threshold 120 (e.g., a "quit" threshold), then the CLF 104 may generate a firmware interrupt. The threshold 120 may be programmable. The CLF 104 may generate the firmware interrupt in response to determining that the number of successive RSET frame retransmissions 118 equals the threshold 120.

The CLF 104 may deactivate the SWP interface 108 based on the firmware interrupt. For example, the CLF hardware can interrupt the CLF firmware regarding a possibly unresponsive SE 106. In particular, the CLF firmware may disable an SWP block, which in turn may deactivate the SWP interface 108.

In some configurations, the CLF 104 (e.g., NFCC) may activate (e.g., reactivate) the SWP interface 108 again in response to a second timer expiration. The second timer may be referred to as a deactivation timer. In an implementation, the second timer may run for a deactivation time (P4). A single wire protocol input/output (SWIO) line may be held low until the second timer expiration (e.g., for at least the P4 time) after deactivation before the SWP interface 108 can be activated again.

Deactivating the SWP interface 108 and re-activating the SWP interface 108 (e.g., after the P4 time) may resolve the problem due to the unresponsive SE 106. This may help the SE 106 resume its normal behavior. In some configurations, the counter 116 may be reset in response to reactivating the SWP interface 108. Additionally or alternatively, the counter 116 may be reset in response to the second timer (e.g., P4 timer) expiration.

It should be noted that the foregoing techniques may be applied during the SHDLC link establishment procedure. For example, the RSET frame 110 retransmission(s) may occur before any payload data is sent or received. Accordingly, counting the number of successive RSET frame retransmissions 118, determining whether a number of successive RSET frame 110 retransmissions has reached a threshold 120, generating a firmware interrupt and/or deactivating the SWP interface 108 may occur before an SHDLC link is established. Accordingly, the foregoing techniques may be applied in order to address SE 106 unresponsiveness before any payload data is sent to the SE 106 and/or received from the SE 106. For example, the SHDLC link establishment procedure may be based on control signaling and may not involve payload data. Accordingly, systems and methods for mitigating the effects of an unresponsive SE 106 during link establishment may be distinct from approaches for handling an unresponsive SE 106 after link establishment (e.g., after the SHDLC link has been established).

It should be noted that the SHDLC layer is responsible for the error-free transmission of data between the CLF 104 and the SE 106. Once the SWP interface 108 is activated and the SHDLC link is established, the CLF 104 and the SE 106 may exchange data payloads using the SHDLC link layer control (LLC).

In some configurations, when using SHDLC LLC, an endpoint (e.g., the CLF 104 or the SE 106) can send data in a frame. One type of frame that may be exchanged between the CLF 104 and the SE 106 is an information frame (I-frame). Other types of frames include supervisory frames (S-frames) and unnumbered frames (U-frames).

An I-frame may carry upper-layer information and some control information. I-frame functions may include sequencing, flow control, error detection and recovery. I-frames may also carry send and receive sequence numbers. Both the S-frame and the U-frame may carry control information. Therefore, to exchange payload data (e.g., upper-layer information), the CLF 104 and the SE 106 may include the payload data in an I-frame.

The systems and methods described herein will enable the CLF 104 to detect that the SE 106 on the other end is not replying after a few tries because the SE 106 may have been removed or is in a bad state. The described systems and methods provide a mechanism to avoid an infinite loop caused by an unresponsive SE 106. This may improve user experience. The described systems and methods may also save power by avoiding the infinite loop. Furthermore, the described systems and methods may facilitate the SE 106 in exiting a bad state.

Figure 2:
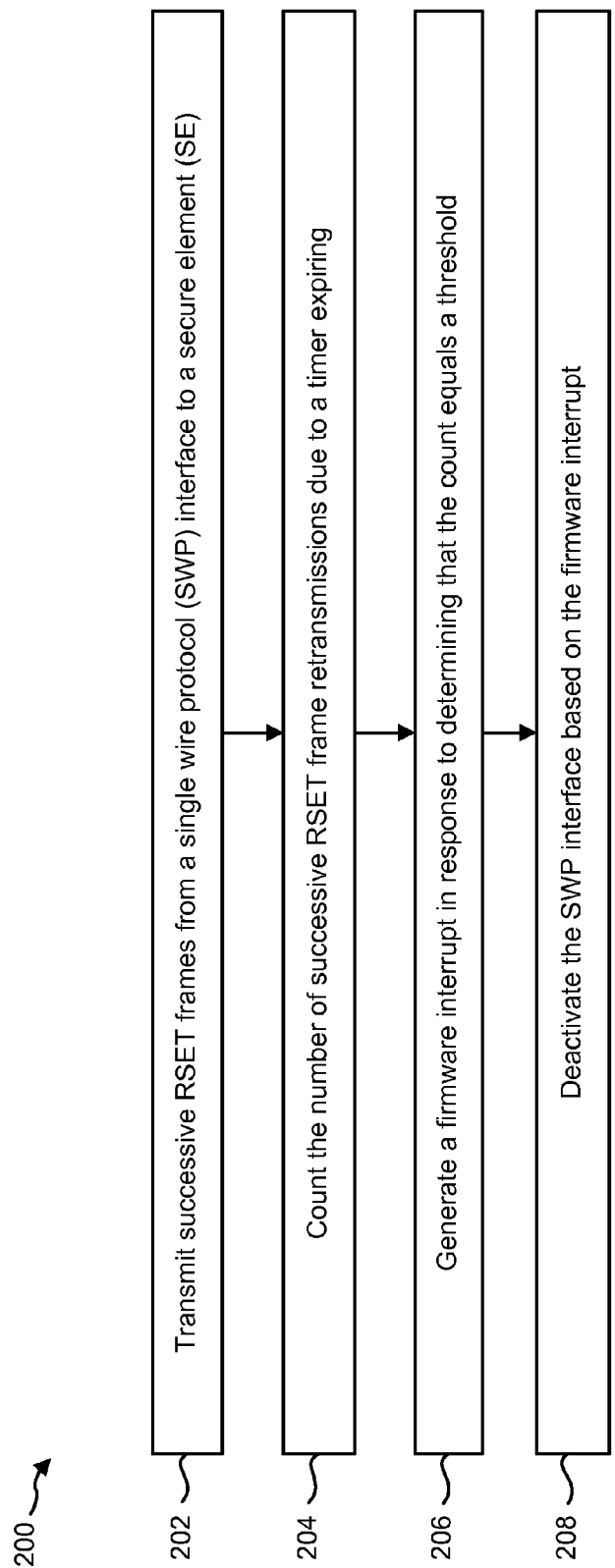
FIG. 2 is a flow diagram illustrating a method for mitigating effects of an unresponsive SE.

FIG. 2 is a flow diagram illustrating a method 200 for mitigating effects of an unresponsive SE 106. The method 200 may be implemented by a contactless front-end (CLF) 104. In one configuration, the CLF 104 may be an NFC chip.

The CLF 104 may transmit 202 successive RSET frames 110 from a single wire protocol (SWP) interface 108 to a secure element (SE) 106. The successive RSET frames may include RSET frame retransmissions. For example, the CLF 104 may activate a single wire protocol (SWP) interface 108 with the SE 106. The CLF 104 may activate the SWP interface 108 as part of a SHDLC link establishment procedure. The CLF 104 may send one or more RSET frames 110 to the SE 106. Upon sending an RSET frame 110, the CLF 104 may start a connection timer 112. The connection timer 112 may expire (e.g., timeout) after a predetermined time (e.g., T3 time). If the SE 106 does not respond (e.g., does not signal a UA frame or another RSET frame), the CLF 104 may retransmit the RSET frame 110.

The CLF 104 may count 204 the number of successive RSET frame retransmission(s) 118 due to the connection timer 112 expiring. For example, when the connection timer 112 expires, a counter 116 may increment. In other words, the number of successive RSET frame retransmissions 118 may increase by one. If the SE 106 responds (e.g., sends a UA frame or another RSET frame), the counter 116 may be reset to zero.

The CLF 104 may determine if the count (e.g., the number of successive RSET frame retransmissions 118) has reached a threshold 120 (e.g., is equal to a threshold 120, is greater than a threshold 120, etc.). It should be noted that the threshold 120 may be configurable (i.e., programmable). The CLF 104 may retransmit the RSET frame(s) 'N' times, where N is any positive integer. Therefore, the value of the retransmission threshold 120 may be defined as N in some configurations.

The CLF 104 may generate 206 a firmware interrupt in response to determining that the count has reached (e.g., is equal to, is greater than, etc.) the threshold 120. For example, the CLF 104 may compare the number of successive RSET frame retransmissions 118 (as indicated by the counter 116) to the threshold 120. If the number of successive RSET frame retransmissions 118 is less than the threshold 120, the CLF 104 may continue to retransmit the RSET frame 110, restart the connection timer 112 and wait for the connection timer 112 to expire. When the count reaches the threshold 120, the CLF 104 may stop retransmitting the RSET frame 110.

Generating 206 the firmware interrupt may include setting a signal. For example, generating 206 the firmware interrupt may include pulling an S1 signal to a low state.

The CLF 104 may deactivate 208 the SWP interface 108 based on the firmware interrupt. For example, the CLF hardware may interrupt the CLF firmware. Interrupting the CLF firmware may disable the SWP block, which may result in deactivating 208 the SWP interface 108.

Figure 3:
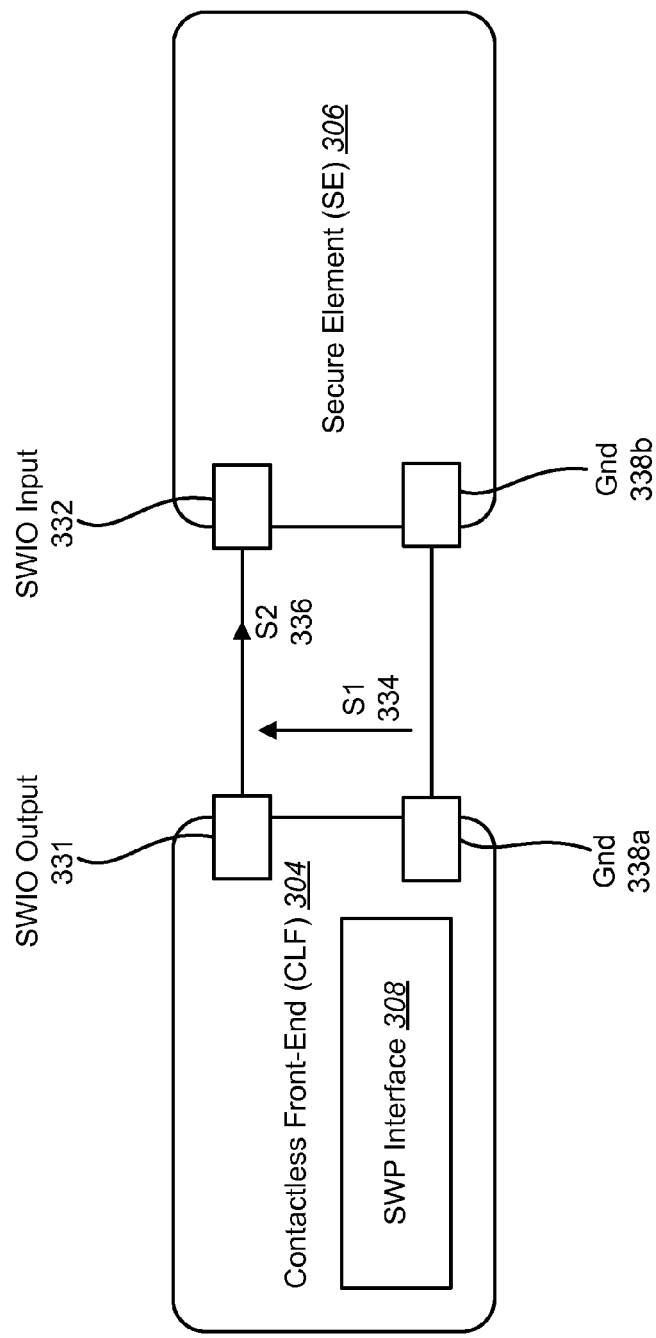
FIG. 3 is a block diagram illustrating one configuration of a single wire protocol (SWP) interface.

FIG. 3 is a block diagram illustrating one configuration of a single wire protocol (SWP) interface 308. A CLF 304 may activate an SWP interface 308 with an SE 306. The SWP interface 308 may be a bit-oriented, point-to-point communication protocol between the CLF 304 and the SE 306. In one configuration the CLF 304 may be the master and the SE 306 may be the slave.

The CLF 304 may include a single wire protocol input/output (SWIO) output 331 that is coupled to a SWIO input 332 of the SE 306. Each of the CLF 304 and the SE 306 may be wired to ground (gnd 338*a-b*).

The principle of the SWP interface 308 is based on the transmission of digital information in full duplex mode. An S1 signal 334 may be transmitted by a digital modulation (e.g., low (L) or high (H) electrical level) in the voltage domain. An S2 signal 336 may be transmitted by a digital modulation (e.g., low or high electrical level) in the current domain.

When the CLF 304 sends the S1 signal 334 as state H, then the SE 306 may either draw a current (state H) or not (state L) and thus transmit S2 signal 336. With pulse width modulation bit coding of S1 334, it is possible to transmit a transmission clock, as well as data in full duplex mode.

Figure 4:
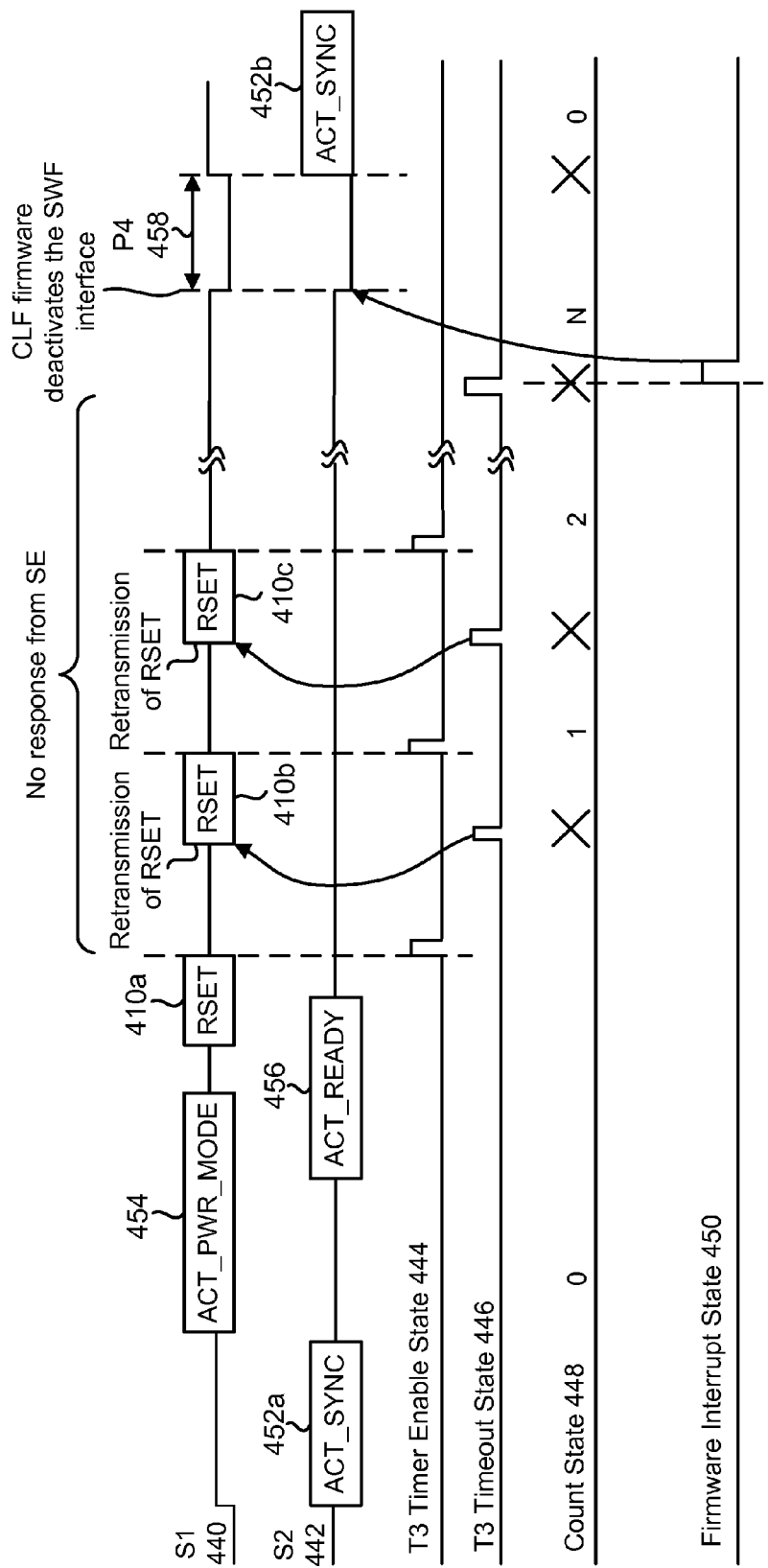
FIG. 4 is a digital timing diagram illustrating an example of operations according to some configurations of the systems and methods disclosed herein.

FIG. 4 is a digital timing diagram illustrating an example of operations according to some configurations of the systems and methods disclosed herein. Specifically, FIG. 4 illustrates an example of an S1 signal 440, an S2 signal 442, a T3 timer enable state 444, a T3 timeout state 446, a count state 448 and a firmware interrupt state 450.

The S1 signal 440 may be a signal that is sent from the CLF 104 (e.g., master) to the SE 106 (e.g., slave). The S2 signal 442 may be a signal that is sent from the SE 106 (e.g., slave) to the CLF 104 (e.g., master).

In some configurations, the S1 signal 440 may be transmitted in the voltage domain and the S2 signal 442 may be transmitted in the current domain. It should be noted that the signaling illustrated in FIG. 4 is a simplified representation of the S1 signal 440 and S2 signal 442. For example, the S1 signal 440 may toggle when a transmission occurs and/or may exhibit idle pulses.

When the SWP interface 108 is activated, the CLF 104 may attempt to establish a simplified high level data link control (SHDLC) link with the SE 106 as described above. As illustrated in FIG. 4, the S1 signal 440 may be set to a high state. The SE 106 may send an ACT_SYNC frame 452*a* on the S2 signal 442. Then, the CLF 104 may send an ACT_PWR_MODE frame 454 on the S1 signal 440. The SE 106 may respond with an ACT_READY frame 456 on the S2 signal 442.

The CLF 104 may send an initial RSET frame 410*a*. The CLF 104 may start a connection timer 112 (e.g., T3 timer) at the end of the RSET frame 410*a* transmission as indicated by the high T3 timer enable state 444. The connection time 114 (T3) may be calculated from the last bit of the end of frame (EOF) of the RSET frame 410*a* to the first bit of the start of frame (SOF) of a response frame from the SE 106. The CLF 104 expects the SE 106 to respond with a response frame (e.g., an unnumbered acknowledgment (UA) frame or another RSET frame to negotiate the SHDLC link parameters like window size and support for SREJ (selective reject)) before the connection timer 112 (e.g., T3 timer) expires.

As illustrated in FIG. 4, however, the SE 106 may not respond or exhibit any activity in some cases. If the SE 106 does not respond (e.g., if the S2 signal 442 does not exhibit any activity), the connection timer 112 (e.g., T3 timer) may timeout as indicated by the high T3 timeout state 446. When the connection timer 112 expires or a timeout occurs, the CLF 104 may retransmit the RSET frame 410.

Some configurations of the systems and methods disclosed herein may keep track of how many times the RSET frame 410 has been retransmitted to the SE 106 without any activity (e.g., response) from the SE 106. As described above, the counter 116 may record the number of successive RSET frame retransmissions 118. If there is no signaling from the SE 106 (e.g., no S2 signal activity), then the counter 116 may increment every time the connection timer 112 (e.g., T3 timer) expires and the RSET frame 410 is retransmitted. This is indicated as the count state 448 in FIG. 4. For example, the first time the RSET frame 410b is retransmitted, the count is incremented from 0 to 1. The second time the RSET frame 410c is retransmitted, the count is incremented from 1 to 2. If the counter 116 reaches the threshold 120 (e.g., a "quit" threshold), then the CLF 104 may generate a firmware interrupt as indicated by the firmware interrupt state 450 in FIG. 4. The threshold 120 is represented as N in FIG. 4.

The CLF 104 may deactivate the SWP interface 108 based on the firmware interrupt. In particular, the CLF (e.g., NFCC) firmware may disable the SWP block, which in turn may deactivate the SWP interface 108. For example, the CLF 104 may pull the S1 signal 440 low to deactivate the SWP interface 108.

In some configurations, the CLF 104 (e.g., NFCC) may activate (e.g., reactivate) the SWP interface 108 again in response to a second timer expiration. This may occur after waiting for a deactivation time (P4) 458. The single wire protocol input/output (SWIO) line may be held low until at least the P4 time 458 after deactivation before the SWP interface 108 can be activated again.

Deactivating the SWP interface 108 and re-activating the SWP interface 108 (e.g., after a P4 time 458) may resolve the problem of the unresponsive SE 106 and help the SE 106 resume its normal behavior. For example, the SE 106 may send a second ACT_SYNC frame 452b on the S2 signal 442 after the P4 time 458 has expired. In some configurations, the counter 116 may be reset in response to reactivating the SWP interface 108 as illustrated by the count state 448 in FIG. 4. Additionally or alternatively, the counter 116 may be reset in response to a second timer (e.g., P4 timer) expiration.

Figure 5:
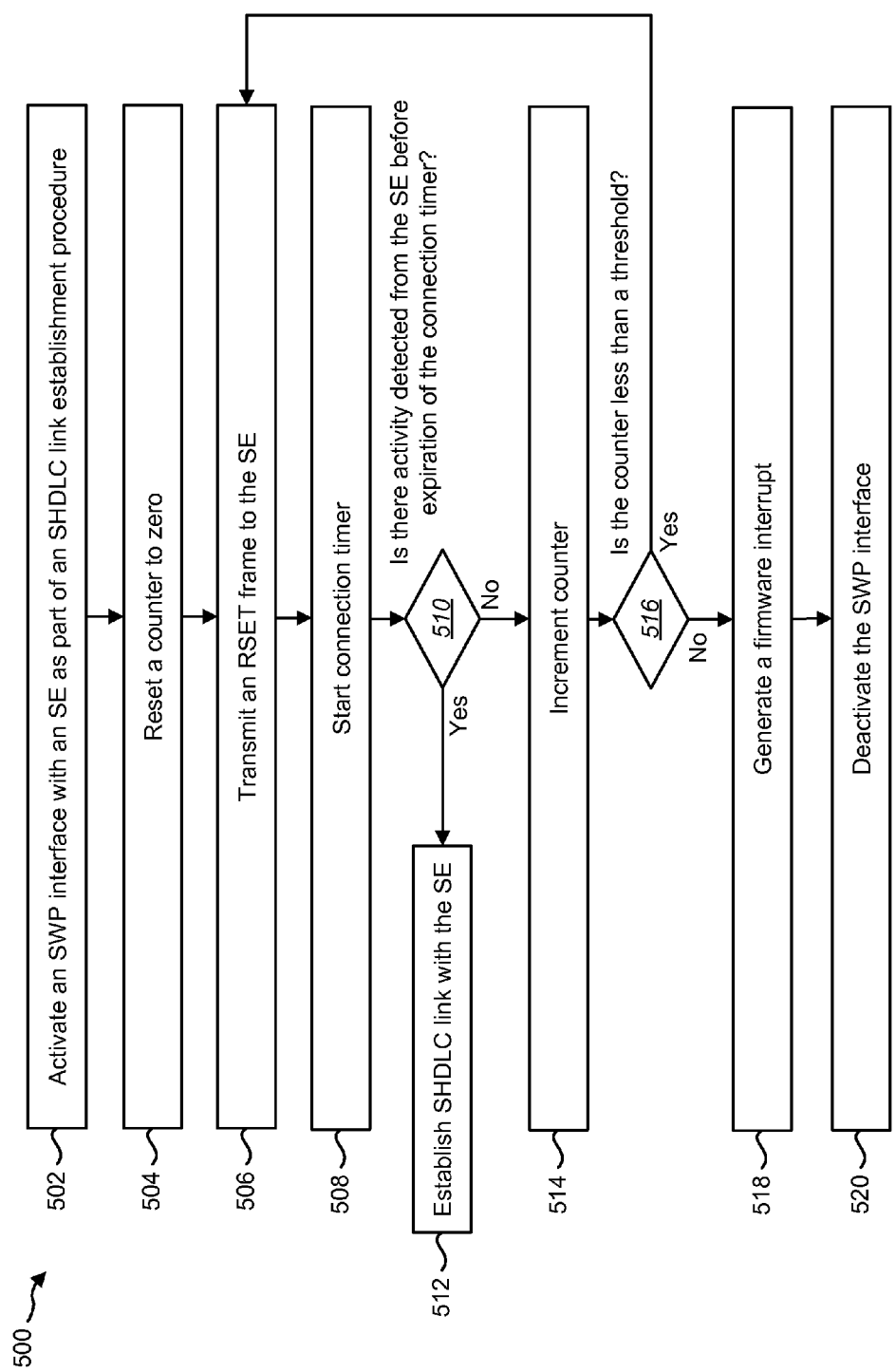
FIG. 5 is a flow diagram illustrating a detailed configuration of a method for mitigating effects of an unresponsive SE.

FIG. 5 is a flow diagram illustrating a detailed configuration of a method 500 for mitigating effects of an unresponsive SE 106. The method 500 may be implemented by a contactless front-end (CLF) 104. In one configuration, the CLF 104 may be an NFC chip.

The CLF 104 may activate 502 a single wire protocol (SWP) interface 108 with an SE 106 as part of an SHDLC link establishment procedure. The CLF 104 may reset 504 a counter 116 to zero. The counter 116 may be used to count the number of successive RSET frame retransmissions 118.

The CLF 104 may transmit 506 an RSET frame 110 to the SE 106. Upon sending the RSET frame 110, the CLF 104 may start 508 a connection timer 112. The connection timer 112 may be set with a predetermined time (e.g., T3 time).

While the connection timer 112 is running, the CLF 104 may determine 510 whether there is detected activity from the SE 106. For example, the CLF expects the SE 106 to respond with a response frame before the connection timer 112 expires. The response frame may be an unnumbered acknowledgment (UA) frame or another RSET frame to negotiate the SHDLC link parameters like window size and support for selective reject (SREJ). If the CLF 104 receives a response from the SE 106, then the CLF 104 may establish 512 the SHDLC link with the SE 106. Furthermore, if the SE 106 responds, the counter 116 may be reset to zero.

Upon expiration of the connection timer 112, if the determines 510 that there is no detected activity from the SE 106 (e.g., the CLF 104 does not receive a response to the RSET frame 110), then the CLF 104 may increment 514 the counter 116. The counter 116 may count the number of successive RSET frame retransmission(s) 118 due to the connection timer 112 expiring.

The CLF 104 may determine 516 whether the counter 116 is less than a threshold 120 (e.g., a "quit" threshold). If the counter 116 (i.e., the number of successive RSET frame retransmission(s) 118) is less than the threshold 120, then the CLF 104 may retransmit 506 an RSET frame 110 to the SE 106 and restart 508 the connection timer 112.

If the CLF 104 determines 516 that the counter 116 (e.g., the number of successive RSET frame retransmissions 118) has reached a threshold 120 (e.g., is equal to a threshold 120, is greater than a threshold 120, etc.), the CLF 104 may generate 518 a firmware interrupt. Generating 518 the firmware interrupt may include setting a signal. For example, generating 518 the firmware interrupt may include pulling an S1 signal 334 to a low state.

The CLF 104 may deactivate 520 the SWP interface 108 based on the firmware interrupt. For example, the CLF hardware may interrupt the CLF firmware. Interrupting the CLF firmware may disable the SWP block, which may result in deactivating 520 the SWP interface 108.

Figure 6:
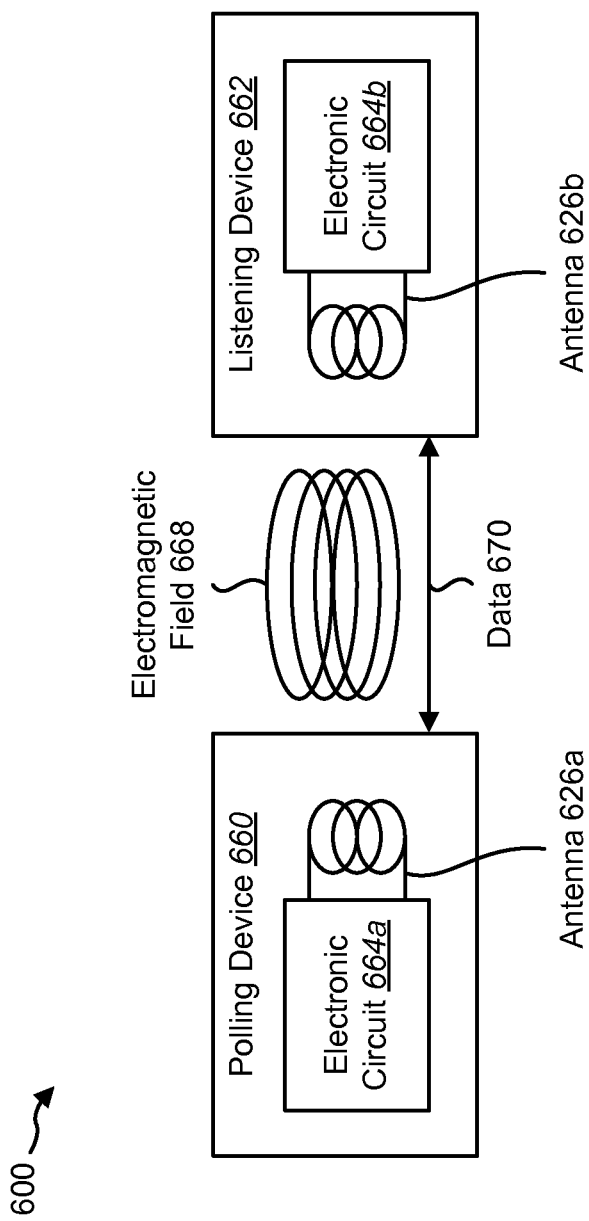
FIG. 6 is a block diagram illustrating one configuration of near-field communication (NFC) in a wireless communication system.

FIG. 6 is a block diagram illustrating one configuration of near-field communication (NFC) in a wireless communication system 600. A polling device 660 and a listening device 662 may operate according to NFC protocols. The polling device 660 and the listening device 662 may be implemented according to electronic device 102 described in connection with FIG. 1. In other words, the electronic device 102 described in connection with FIG. 1 may operate as either a polling device 660, a listening device 662 or both.

Each device 660, 662 may include an antenna 626a-b connected to an electronic circuit 664a-b. During operation, the combination of two NFC devices (i.e., the polling device 660 and listening device 662) may behave like a transformer.

NFC is an inductive coupling communication technology. The two NFC-capable devices 660, 662 may be separated by a distance. An alternating current may pass through a primary coil (i.e., the polling device antenna 626a) and create an electromagnetic field 668 (which may also be referred to as a radio frequency (RF) field or radiated field). The electromagnetic field 668 may induce a current in the secondary coil (i.e., the listening device antenna 626b). The listening device 662 may use the electromagnetic field 668 transmitted by the polling device 660 to power itself.

The configuration and tuning of both antennas 626a-b may determine the coupling efficiency from one device to the other device. During certain NFC transactions, the listening device 662 may function as a target, which is a role defined in the NFC standards.

In one configuration, the NFC transmitter of one device and the NFC receiver of the other device are configured according to a mutual resonant relationship. When the resonant frequency of the NFC receiver and the resonant frequency of the NFC transmitter are very close, transmission losses between the NFC transmitter and the NFC receiver are minimal when the NFC receiver is located in the "near-field" of the radiated field.

An NFC device may include an NFC loop antenna 626. The NFC loop antenna 626 may provide a means for energy transmission and reception. As stated, an efficient energy transfer may occur by coupling a large portion of the energy in the near-field of a transmitting antenna 626 to a receiving antenna 626 rather than propagating most of the energy in an electromagnetic wave to the far field.

An NFC-capable device may obtain sufficient data 670 to allow for communications to be established. One form of communications that may be established is an international standards organization data exchange protocol (ISO-DEP) communication link. Communications between the NFC devices may be enabled over a variety of NFC radio frequency (RF) technologies, including but not limited to, NFC-A, NFC-B, etc.

Figure 7:
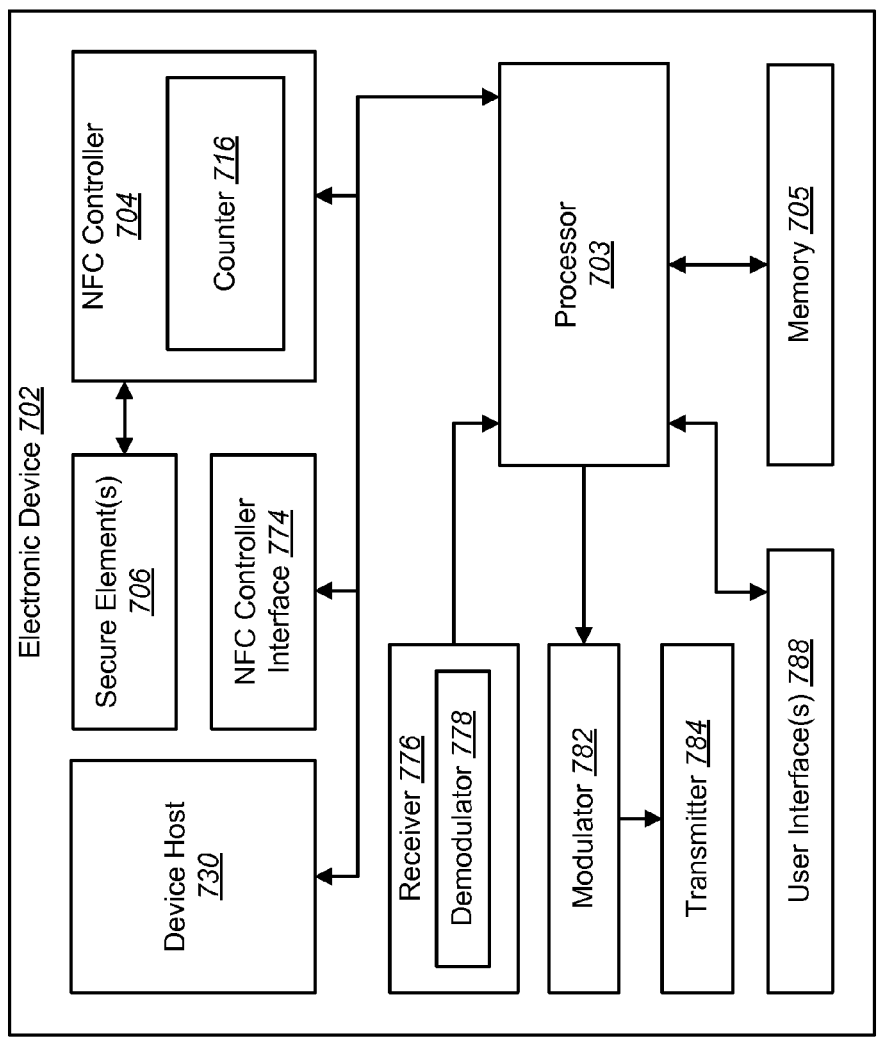
FIG. 7 is a block diagram illustrating another more specific configuration of an electronic device in which systems and methods for mitigating effects of an unresponsive SE during link establishment may be implemented.

FIG. 7 is a block diagram illustrating another more specific configuration of an electronic device 702 in which systems and methods for mitigating effects of an unresponsive secure element (SE) 706 may be implemented. The components included within the electronic device 702 may be examples of corresponding components described above in connection with one or more of FIGS. 1, 3 and 6.

As depicted in FIG. 7, the electronic device 702 includes a receiver 776 that receives a signal from, for instance, a receive antenna (not shown), performs typical actions on (e.g., filters, amplifies, downconverts, etc.) the received signal, and digitizes the conditioned signal to obtain samples. The receiver 776 can comprise a demodulator 778 that can demodulate received symbols and provide them to a processor 703 for channel estimation. The processor 703 can be a processor dedicated to analyzing information received by the receiver 776 and/or generating information for transmission by the transmitter 784, a processor that controls one or more components of the electronic device 702, and/or a processor that analyzes information received by the receiver 776, generates information for transmission by the transmitter 784 and controls one or more components of the electronic device 702. Further, signals may be prepared for transmission by the transmitter 784 through the modulator 782, which may modulate the signals processed by the processor 703.

The electronic device 702 can additionally comprise memory 705 that is operatively coupled to the processor 703 and that can store data to be transmitted, received data, information related to available channels, transmission control protocol (TCP) flows, data associated with analyzed signal and/or interference strength, information related to an assigned channel, power, rate or the like, and any other suitable information for estimating a channel and communicating via the channel.

Further, the processor 703, receiver 776, transmitter 784, NFC controller 704, and/or the device host 730 may perform one or more of the functions described above in connection with FIGS. 1-6. It will be appreciated that the data store (e.g., memory 705) described herein can be either volatile memory or nonvolatile memory, or can include both volatile and non-volatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The memory 705 of the subject systems and methods may comprise, without being limited to, these and any other suitable types of memory.

In another aspect, the electronic device 702 may include an NFC controller interface (NCI) 774. In an aspect, the NCI 774 may be operable to enable communications between the device host 730 and the NFC controller 704.

The electronic device 702 may include an NFC controller 704. The NFC controller 704 is one example of a contactless front-end (CLF) 104, as described in connection with FIG. 1. The NFC controller 704 may communicate with one or more secure elements (SEs) 706. The NFC controller 704 may include a counter 716 that counts the number of successive RSET frame retransmissions 118 in order to discontinue RSET frame 110 retransmission and deactivate an SWP interface 108 with an unresponsive SE 706.

In an aspect, the NFC controller 704 may be operable to obtain, through the NCI 774, information from other devices, such as a remote NFC device. During ISO-DEP communication, the NFC controller 704 may operate using a frame RF interface or an ISO-DEP interface. When operating using the ISO-DEP interface, the NFC controller 704 may be operable to change various parameters associated with communications between the device host 730 and a remote NFC device using a data exchange change module.

In some configurations, the NFC controller 704 may act as a relay and communicate messages between the device host 730 and a remote NFC device. For example, the device host 730 may extract data from messages exchanged with the remote NFC device. Communications may prompt the NFC controller 704 to change various data. The NFC controller 704 may update received parameters and/or may store parameters in memory.

Additionally, the electronic device 702 may include one or more user interfaces 788. The user interface(s) 788 may include input mechanism(s) for generating inputs into the electronic device 702 and/or output mechanism(s) for generating information for consumption by the user of the electronic device 702. For example, input mechanism(s) may include a mechanism such as a key or keyboard, a mouse, a touch-screen display, a microphone, etc. Further, for example, output mechanism(s) may include a display, an audio speaker, a haptic feedback mechanism, a Personal Area Network (PAN) transceiver etc. In the illustrated aspects, the output mechanism may include a display operable to present media content that is in image or video format or an audio speaker to present media content that is in an audio format.

Figure 8:
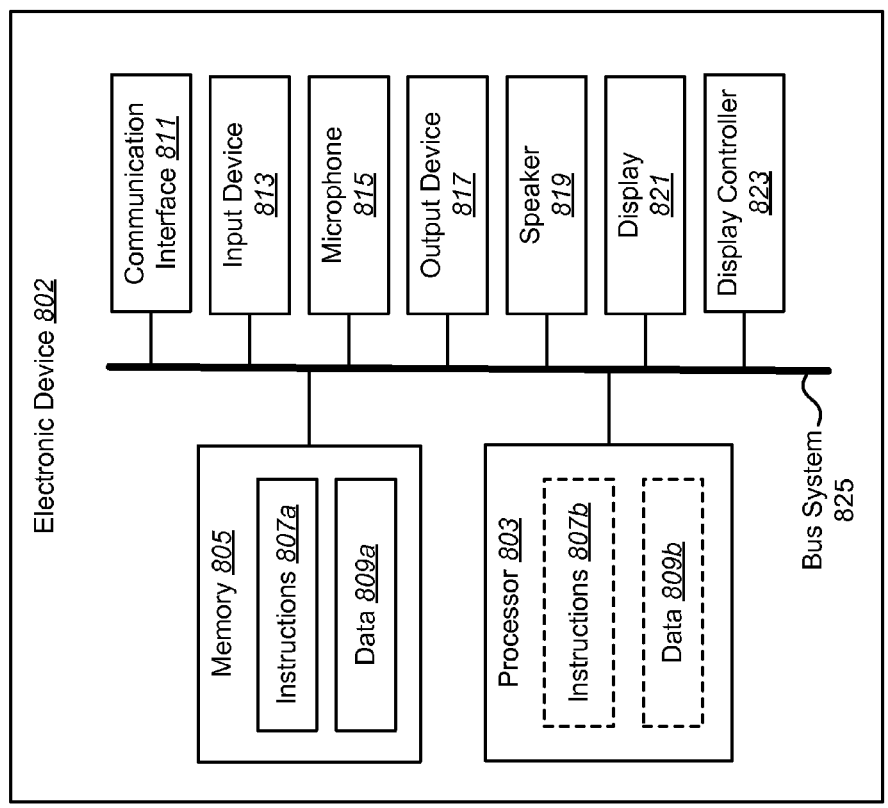
FIG. 8 illustrates various components that may be utilized in an electronic device.

FIG. 8 illustrates various components that may be utilized in an electronic device 802. The illustrated components may be located within the same physical structure or in separate housings or structures. The electronic device 802 described in connection with FIG. 8 may be implemented in accordance with one or more of the electronic devices 102, 702 described herein.

The electronic device 802 includes a processor 803. The processor 803 may be a general purpose single- or multi-chip microprocessor (e.g., an advanced RISC machine (ARM)), a special purpose microprocessor (e.g., a digital signal processor (DSP)), a microcontroller, a programmable gate array, etc. The processor 803 may be referred to as a central processing unit (CPU). Although just a single processor 803 is shown in the electronic device 802 of FIG. 8, in an alternative configuration, a combination of processors 803 (e.g., an ARM and DSP) could be used.

The electronic device 802 also includes memory 805 in electronic communication with the processor 803. That is, the processor 803 may read information from and/or write information to the memory 805. The memory 805 may be any electronic component capable of storing electronic information. The memory 805 may be random access memory (RAM), read-only memory (ROM), magnetic disk storage media, optical storage media, flash memory devices in RAM, on-board memory included with the processor 803, programmable read-only memory (PROM), erasable programmable read-only memory (EPROM), electrically erasable PROM (EEPROM), registers, and so forth, including combinations thereof.

Data 809*a* and instructions 807*a* may be stored in the memory 805. The instructions 807*a* may include one or more programs, routines, sub-routines, functions, procedures, etc. The instructions may include a single computer-readable statement or many computer-readable statements. The instructions 807*a* may be executable by the processor 803 to implement one or more of the methods, functions and procedures described above. Executing the instructions may involve the use of the data 809*a* that is stored in the memory 805. FIG. 8 shows some instructions 807*b* and data 809*b* being loaded into the processor 803 (which may come from instructions 807*a* and data 809*a* that are stored in the memory 805).

The electronic device 802 may also include one or more communication interfaces 811 for communicating with other electronic devices. The communication interfaces 811 may be based on wired communication technology, wireless communication technology, or both. Examples of different types of communication interfaces 811 include a serial port, a parallel port, a Universal Serial Bus (USB), an Ethernet adapter, an Institute of Electrical and Electronics Engineers (IEEE) 1394 bus interface, a near-field communication (NFC) transceiver, a small computer system interface (SCSI) bus interface, an infrared (IR) communication port, a Bluetooth wireless communication adapter, a 3rd Generation Partnership Project (3GPP) transceiver, an IEEE 802.11 ("Wi-Fi") transceiver and so forth. For example, the communication interface 811 may be coupled to one or more antennas (not shown) for transmitting and receiving wireless signals.

The electronic device 802 may also include one or more input devices 813 and one or more output devices 817. Examples of different kinds of input devices 813 include a keyboard, mouse, microphone 815, remote control device, button, joystick, trackball, touchpad, lightpen, etc. For instance, the electronic device 802 may include one or more microphones 815 for capturing acoustic signals. In one configuration, a microphone 815 may be a transducer that converts acoustic signals (e.g., voice, speech) into electrical or electronic signals. Examples of different kinds of output devices 817 include a speaker 819, printer, etc. For instance, the electronic device 802 may include one or more speakers 819. In one configuration, a speaker 819 may be a transducer that converts electrical or electronic signals into acoustic signals. One specific type of output device 817 that may be typically included in an electronic device 802 is a display 821 device. Display 821 devices used with configurations disclosed herein may utilize any suitable image projection technology, such as a cathode ray tube (CRT), liquid crystal display (LCD), light-emitting diode (LED), gas plasma, electroluminescence, or the like. A display controller 823 may also be provided, for converting data stored in the memory 805 into text, graphics, and/or moving images (as appropriate) shown on the display 821 device.

The various components of the electronic device 802 may be coupled together by one or more buses, which may include a power bus, a control signal bus, a status signal bus, a data bus, etc. For simplicity, the various buses are illustrated in FIG. 8 as a bus system 825. It should be noted that FIG. 8 illustrates only one possible configuration of an electronic device 802. Various other architectures and components may be utilized.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 2 and FIG. 5, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method of communicating with a secure element (SE), comprising:
    transmitting successive RSET frames from a single wire protocol (SWP) interface to an SE, the successive RSET frames including RSET frame retransmissions;
    counting a number of successive RSET frame retransmissions due to a timer expiring;
    generating a firmware interrupt in response to determining that the count has reached a threshold; and
    deactivating the SWP interface based on the firmware interrupt.

2. The method of claim 1, wherein the RSET frame retransmissions occur during a simplified high level data link control (SHDLC) link establishment procedure.

3. The method of claim 1, wherein the SWP interface is established by a contactless front-end (CLF) communicatively coupled to the SE.

4. The method of claim 3, wherein the CLF comprises a near-field communication (NFC) controller, and wherein the SE comprises at least one of a universal integrated circuit card (UICC) or an embedded SE.

5. The method of claim 1, wherein the RSET frame retransmissions occur before any payload data is sent or received.

6. The method of claim 1, further comprising resetting the count in response to detecting activity from the SE.

7. The method of claim 1, further comprising resetting the count in response to reactivating the SWP interface.

8. The method of claim 1, further comprising resetting the count in response to a second timer expiration.

9. An electronic device configured to communicate with a secure element (SE), comprising:
    a processor;
    a memory in communication with the processor; and
    instructions stored in the memory, the instructions executable by the processor to:
        transmit successive RSET frames from a single wire protocol (SWP) interface to an SE, the successive RSET frames including RSET frame retransmissions;
        count a number of successive RSET frame retransmissions due to a timer expiring;
        generate a firmware interrupt in response to determining that the count has reached a threshold; and
        deactivate the SWP interface based on the firmware interrupt.

10. The electronic device of claim 9, wherein the RSET frame retransmissions occur during a simplified high level data link control (SHDLC) link establishment procedure.

11. The electronic device of claim 9, wherein the SWP interface is established by a contactless front-end (CLF) communicatively coupled to the SE.

12. The electronic device of claim 11, wherein the CLF comprises a near-field communication (NFC) controller, and wherein the SE comprises at least one of a universal integrated circuit card (UICC) or an embedded SE.

13. The electronic device of claim 9, wherein the RSET frame retransmissions occur before any payload data is sent or received.

14. The electronic device of claim 9, wherein the instructions are further executable to reset the count in response to detecting activity from the SE.

15. The electronic device of claim 9, wherein the instructions are further executable to reset the count in response to reactivating the SWP interface.

16. The electronic device of claim 9, wherein the instructions are further executable to reset the count in response to a second timer expiration.

17. An apparatus configured to communicate with a secure element (SE), comprising:
    means for transmitting successive RSET frames from a single wire protocol (SWP) interface to an SE, the successive RSET frames including RSET frame retransmissions;
    means for counting a number of successive RSET frame retransmissions due to a timer expiring;
    means for generating a firmware interrupt in response to determining that the count has reached a threshold; and
    means for deactivating the SWP interface based on the firmware interrupt.

18. The apparatus of claim 17, wherein the RSET frame retransmissions occur during a simplified high level data link control (SHDLC) link establishment procedure.

19. The apparatus of claim 17, wherein the SWP interface is established by a contactless front-end (CLF) communicatively coupled to the SE.

20. The apparatus of claim 17, wherein the RSET frame retransmissions occur before any payload data is sent or received.

21. The apparatus of claim 17, further comprising means for resetting the count in response to detecting activity from the SE.

22. The apparatus of claim 17, further comprising means for resetting the count in response to reactivating the SWP interface.

23. The apparatus of claim 17, further comprising means for resetting the count in response to a second timer expiration.

24. A computer-program product for communicating with a secure element (SE), the computer-program product comprising a non-transitory computer-readable medium having instructions thereon, the instructions comprising:

code for causing an electronic device to transmit successive RSET frames from a single wire protocol (SWP) interface to an SE, the successive RSET frames including RSET frame retransmissions;

code for causing the electronic device to count a number of successive RSET frame retransmissions due to a timer expiring;

code for causing the electronic device to generate a firmware interrupt in response to determining that the count has reached a threshold; and code for causing the electronic device to deactivate the SWP interface based on the firmware interrupt.

25. The computer-program product of claim 24, wherein the RSET frame retransmissions occur during a simplified high level data link control (SHDLC) link establishment procedure.

26. The computer-program product of claim 24, wherein the SWP interface is established by a contactless front-end (CLF) communicatively coupled to the SE.

27. The computer-program product of claim 24, wherein the RSET frame retransmissions occur before any payload data is sent or received.

28. The computer-program product of claim 24, wherein the instructions further comprise code for causing the electronic device to reset the count in response to detecting activity from the SE.

29. The computer-program product of claim 24, wherein the instructions further comprise code for causing the electronic device to reset the count in response to reactivating the SWP interface.

30. The computer-program product of claim 24, wherein the instructions further comprise code for causing the electronic device to reset the count in response to a second timer expiration.

\* \* \* \* \*